(12) United States Patent
Donovan et al.

(10) Patent No.: US 10,332,115 B2
(45) Date of Patent: Jun. 25, 2019

(54) SYSTEMS AND METHODS FOR PROCESSING METADATA STATEMENTS IN PAYMENT FLOWS

(71) Applicant: American Express Travel Related Services Company, Inc., New York, NY (US)

(72) Inventors: Michael Donovan, Washington, CT (US); Jonathan Lupton, Littlehampton (GB); Upendra Mardikar, San Jose, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 355 days.

(21) Appl. No.: 15/066,738

(22) Filed: Mar. 10, 2016

(65) Prior Publication Data
US 2017/0262854 A1 Sep. 14, 2017

(51) Int. Cl.
*G06Q 30/00* (2012.01)
*G06Q 20/40* (2012.01)

(52) U.S. Cl.
CPC ..... *G06Q 20/40145* (2013.01); *G06Q 20/405* (2013.01); *G06Q 20/409* (2013.01)

(58) Field of Classification Search
CPC .................................................... G06Q 20/40
USPC ...... 705/44, 1.1, 50, 71, 35, 14.24, 26.4, 38; 235/379, 382; 382/118, 115
See application file for complete search history.

(56) References Cited

U.S. PATENT DOCUMENTS

| 7,318,050 | B1 * | 1/2008 | Musgrave | G06Q 20/40 |
| | | | | 235/379 |
| 9,413,533 | B1 * | 8/2016 | Lindemann | H04L 9/3247 |
| 2011/0178931 | A1 * | 7/2011 | Kia | G06Q 10/06 |
| | | | | 705/50 |

* cited by examiner

*Primary Examiner* — John H. Holly
(74) *Attorney, Agent, or Firm* — Snell & Wilmer, L.L.P.

(57) ABSTRACT

A system may receive a transaction request for a transaction using a transaction authorization protocol. The transaction request may include a transaction amount and may also be associated with a transaction account. The system may transmit a request to authenticate a user associated with the transaction account. The request to authenticate uses the transaction authorization protocol. The system may also receive an authentication message using the transaction authorization protocol. The authentication message may comprise authentication metadata that indicates an authentication type and/or an authentication outcome. The authentication type may include biometric authentication techniques.

20 Claims, 4 Drawing Sheets

SYSTEMS AND METHODS FOR PROCESSING METADATA STATEMENTS IN PAYMENT FLOWS

FIELD

The present disclosure relates to using authentication metadata statements for payment processing and transaction risk analysis within transaction authorization protocols.

BACKGROUND

The number of digital transactions grows as e-commerce grows prevalent in day-to-day spending. Digital transactions may include a consumer providing transaction account information to complete purchases. However, fraudulent consumers may attempt purchases using the transaction account information of others. User authentication may limit fraudulent transactions by validating the consumer identity to a satisfactory degree.

Transaction account information may be stored on a digital wallet running on a user device, in a file at a merchant (or service provider), at an application content provider, and/or on a user device in an application. Sensitive transaction account information may be transmitted using transaction protocols such as EMV, for example, to complete purchase transactions. However, transaction protocols may not support many user authentication methods.

Transaction account providers, merchants, and transaction account holders may usually mitigate some fraud risk using various techniques including authentication and risk management policies, where available. Merchants and banks, for example, seeking to use modern authentication techniques may be faced with large development costs in light of the lack of support for emerging authentication techniques in transaction protocols. Thus, modern authentication techniques often increase the cost and complexity of development and support.

SUMMARY

A system, method, and computer readable medium (collectively, the "system") is disclosed for processing transactions using transaction authorization protocols that integrate authentication metadata. In various embodiments, the system may receive a transaction request for a transaction using a transaction authorization protocol. The transaction request may include a transaction amount and may also be associated with a transaction account. The system may transmit a request to authenticate a user associated with the transaction account. The request to authenticate uses the transaction authorization protocol. The system may also receive an authentication message using the transaction authorization protocol. The authentication message may comprise authentication metadata that indicates an authentication type and/or an authentication outcome. The authentication type may include biometric authentication techniques.

In various embodiments, the authentication type comprises a cardholder verification method (CVM) and/or a consumer device cardholder verification method (CDCVM). The system may receive a statistic from an authentication system with the statistic associated with the authentication metadata. The statistic may include a false match rate, a false acceptance rate, a false non-match rate, a false artifact acceptance rate, a false rejection rate, a detection error tradeoff, an equal error rate, a failure to enrollee rate, and/or a failure to capture rate. The authentication metadata may indicate a successful authentication of the user associated with the transaction account. The system may further authorize the transaction in response to the authentication metadata indicating a successful authentication outcome. The biometric authentication may include a fingerprint authentication, a facial authentication, and/or a vocal authentication.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Transaction processing systems described herein may incorporate identification-centric metadata elements into transaction authorization protocols. A transaction authorization protocol may include a set of standards and procedures for communication and decisioning on purchase transactions. Exemplary transaction authorization protocols include host-card emulation (e.g., the HCE network specifications supported by American Express Company) and browser-based protocols (e.g., the SafeKey® 3-D Secure® transaction tools supported by American Express Company), which are incorporated herein by reference for all purposes. Identification-centric metadata elements may be incorporated into existing transaction authorization protocols and/or added into future transaction authorization protocols and future in-app payment protocols to support both on-card and on-line cardholder verification methods (CVM) and/or consumer device cardholder verification method (CDCVM). Identification-centric metadata may be used to verify users based on, for example, biometric identifiers such as a fingerprint, image, handwriting, and/or voice (e.g., during the transaction process).

Terms such as "identification-centric metadata," "authentication metadata," or similar terms may be used interchangeably herein. Identification-centric metadata may include metadata that describes authentication techniques, authentication preferences, and/or authentication results. For example, identification-centric metadata may indicate that an authenticator conducted facial recognition authentication for a transaction account, that the authentication was successful, and that a specific facial template type was used in the authentication. In that regard, identification-centric metadata may include flag bits identifiable to parties using the transaction authorization protocol including the identification-centric metadata.

Authenticators may conduct authentication techniques including, for example, biometric authentication techniques. Authenticators may transmit metadata describing the executed authentication techniques to relying parties. Relying parties may receive the identification-centric metadata and evaluate whether to rely on the conducted authentication process based on the authentication metadata. By using authentication conducted at an authenticator, the biometric data and/or templates may be securely maintained in a database by the authenticator, while metadata describing the biometric data is used for transmission and/or evaluation by the relying party.

The introduction metadata for identification tends to reduce fraud risk and improve overall session security for transactions where the transacting user can be identified with greater reliability. By integrating the identification-centric metadata into the transaction authorization protocols at a low level, the added identification and verification (ID&V) techniques supported by the identification-centric metadata may be more readily adopted by merchants and financial institutions.

Figure 1:
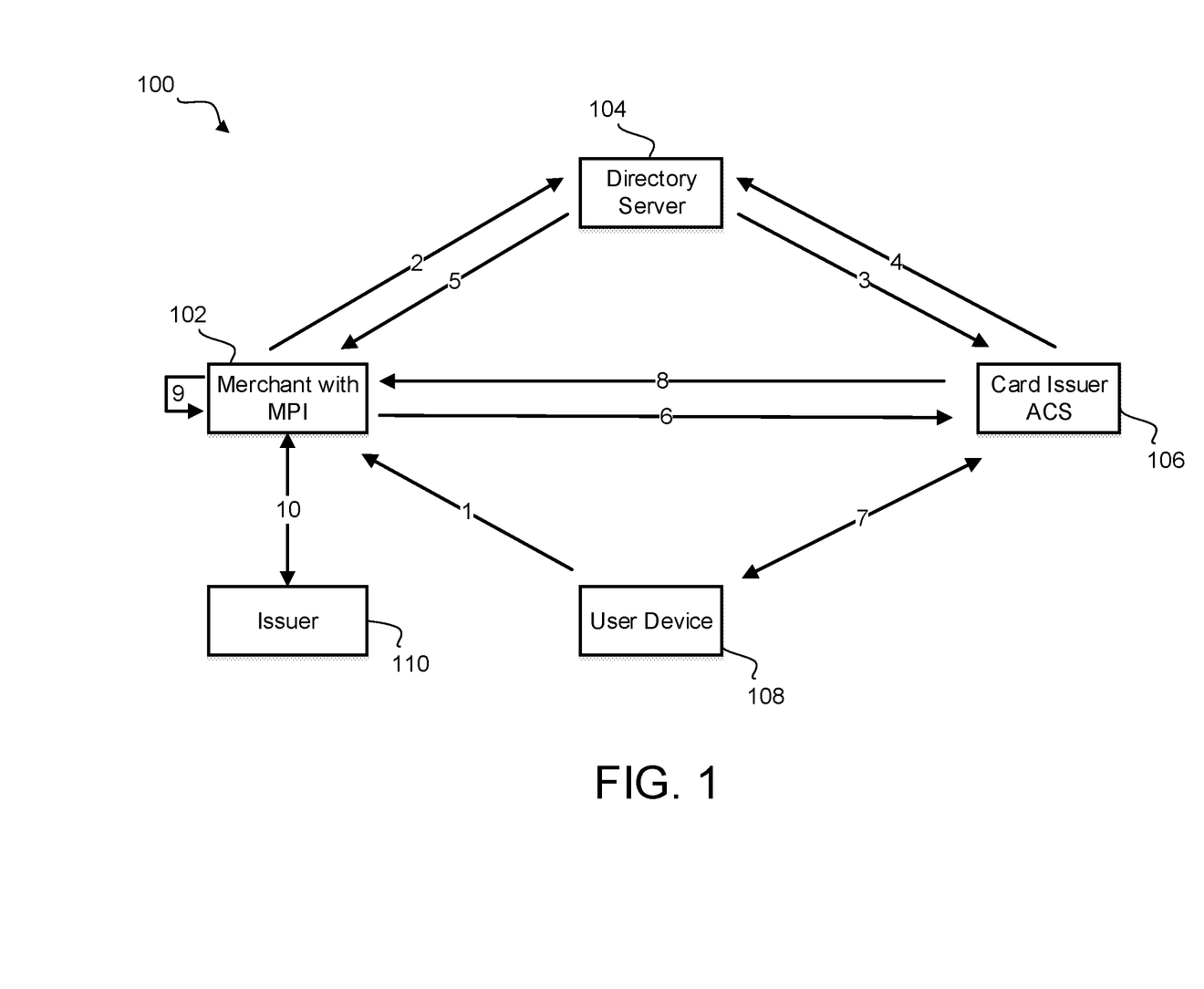
FIG. 1 illustrates an exemplary system for processing payments using authentication metadata integrated into the protocol, in accordance with various embodiments.

Referring now to FIG. 1, system 100 for processing web-based transactions using authentication metadata integrated into a transaction authorization protocol is shown, in accordance with various embodiments. System 100 may include a merchant 102 having a merchant plugin (MPI) for use in completing 3D secure transactions. An MPI may be a software plugin maintained by an account issuer or a third-party to facilitate electronic communication with directory server 104, card issuer access control server (ACS), user device 108 and/or issuer 110. Merchant 102, directory server 104, card issuer ACS 106, user device 108, and issuer 110 may communicate with each other.

In various embodiments, directory server 104 may maintain a database of transaction accounts registered to use the transaction authorization protocol and authentication metadata herein. Directory server 104 may be computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads®, iMacs®, and MacBooks®, kiosks, terminals, point of sale (POS) devices and/or terminals, televisions, or any other device capable of receiving data over a network. Card issuer ACS 106, merchant 102, and issuer 110 may maintain similar computing units or systems to communicate with the entities in system 100 over a network such as the Internet.

In various embodiments, user device 108 may communicate over a network using a computing device or web client. A web client includes any device (e.g., personal computer) which communicates via any network, for example such as those discussed herein. Such browser applications comprise Internet browsing software installed within a computing unit or a system to conduct online transactions and/or communications. These computing units or systems may be one of the above enumerated computing devices or another suitable computing device capable of communication in system 100. A web-client may run a software packages such as a web browser available for browsing the internet.

Practitioners will appreciate that a web client used by user device 108 may or may not be in direct contact with a server maintained by merchant 102 and/or card issuer ACS 106. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package and/or through a dedicate third-party mobile application.

As those skilled in the art will appreciate, a web client includes an operating system as well as various conventional support software and drivers typically associated with computers. A web client may implement security protocols such as Secure Sockets Layer (SSL) and Transport Layer Security (TLS). A web client may implement one or more application layer protocols including http, https, ftp, and sftp.

Figure 2:
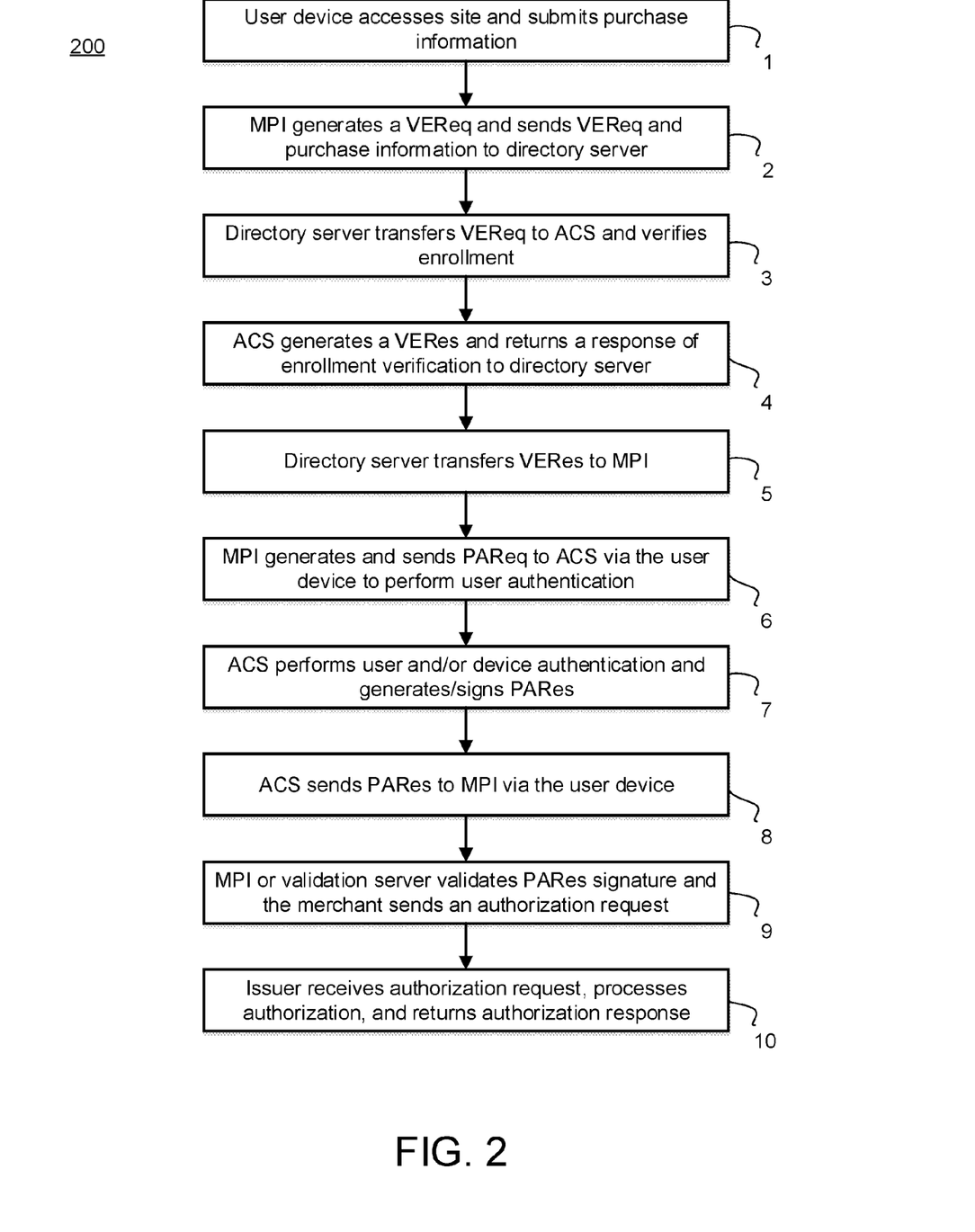
FIG. 2 illustrates an exemplary process for processing payments using authentication metadata integrated into the protocol, in accordance with various embodiments.

Referring now to FIGS. 1 and 2, a process 200 for completing web-based transactions using a transaction authorization protocol with integrated authentication metadata on system 100 is shown, in accordance with various embodiments. Process 200 is a transaction authorization process similar to the SafeKey® authentication tools supported by American Express Company and augmented with integrated identification-centric metadata included within the protocol communications. Thus, process 200 may use the VEReq/VERes and PAReq/PARes pairing of requests and responses for authentication purposes with the requests and responses providing support for identification-centric metadata. The identification-centric metadata may describe, for example, biometric authentication techniques used to authenticate and/or identify a user.

In various embodiments, user device 108 accesses a merchant site and submits purchase information (Step 1). Merchant 102 MPI may generate a VEReq (i.e., a verify enrollment request) and transmit the VEReq and purchase information to directory server 104 (Step 2). Directory server 104 may transfer the VEReq to card issuer ACS 106 and verify enrollment (Step 3). Directory server 104 may verify enrollment of the transaction account by checking the transaction account against a database of enrolled accounts. Card issuer ACS 106 may generate a VERes (a verify enrollment response) and return a response of enrollment verification to directory server 104 (Step 4). The VERes message may include information used to generate a payment authentication request.

In various embodiments, directory server 104 may transfer the VERes to merchant 102 MPI (Step 5). Merchant 102 MPI may generate and send a PAReq (a payment authorization request) to card issuer ACS 106 via user device 108 to perform authentication (Step 6). The PAReq is generated by the MPI in response to the transaction account being enrolled for the transaction authorization protocol of process 200. The PAReq contains information from the VERes message such as, for example, details for completing user and/or device authentication. Details for completing authentication may include a web site or other interface where user device 108 may submit authentication information. Authentication details are described in greater detail below.

In various embodiments, card issuer ACS 106 may perform user and/or device authentication and generate/sign a PARes message (Step 7). The PARes message may include identification-centric metadata describing the authentication process. For example, the PARes message may include metadata that indicates which authentication techniques were used, the outcome of the authentication techniques (success or failure), and/or statistics about the applied authentication techniques. A relying party may take the identification-centric metadata into account in determining whether to rely on the authentication.

In various embodiments, card issuer ACS 106 may send the PARes to merchant 102 MPI via user device 108 (Step 8). Merchant 102 MPI or a validation server may validate the PARes signature and merchant 102 may send an authorization request in response to the validated PARes (Step 9). Issuer 110 may receive the authorization request, process the authorization, and return an authorization response (Step 10). Process 200 thus may enable biometric authentication and/or device authentication by including identification-centric metadata in the PAReq/PARes request and response pair to describe the authentication techniques applied. The identification-centric metadata may describe authentication for no signature, signature, PIN, passcode, patterns, biometrics, one-time passwords, knowledge based answers, device ID, device fingerprints, and other suitable authentication techniques. Identification-centric metadata used in the transaction authorization protocol of process 200 may indicate the use and outcome of facial recognition, vocal recognition, fingerprinting, handwriting, and/or other biometric authentication techniques to verify the identity of a user.

Figure 3:
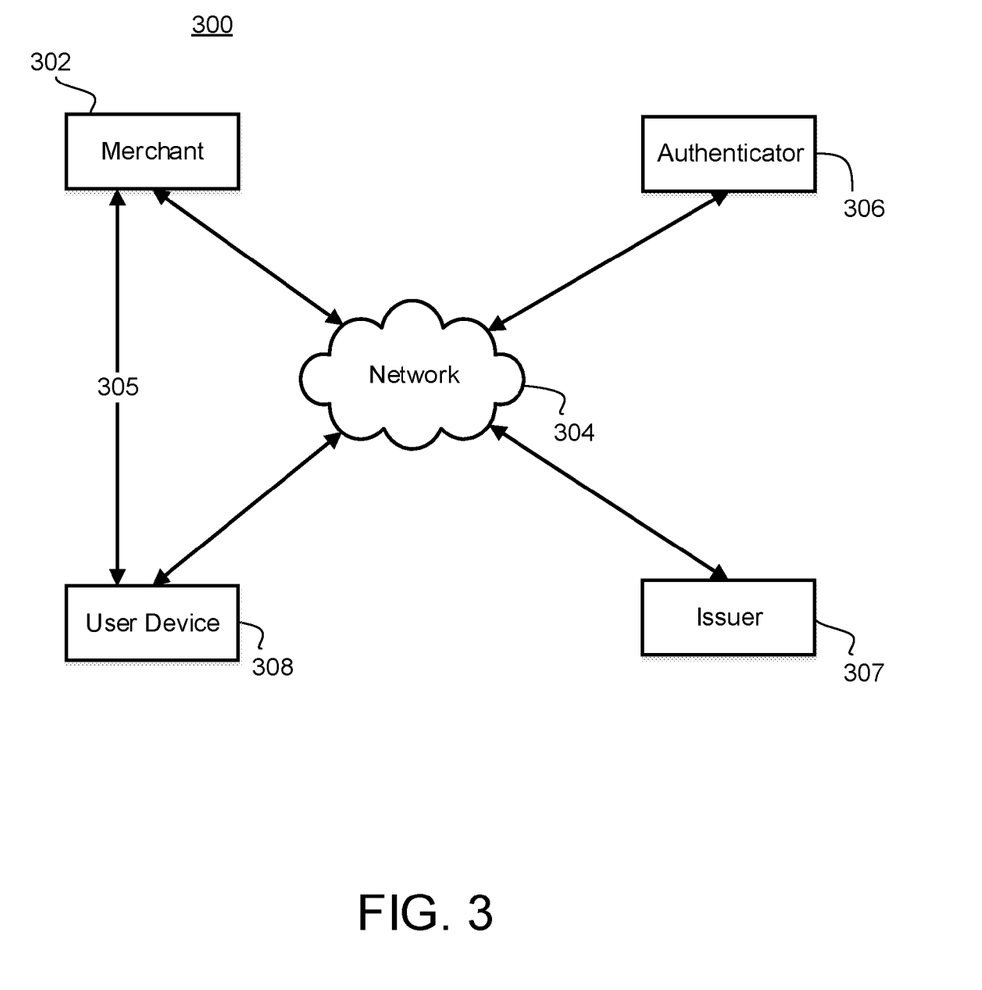
FIG. 3 illustrates an exemplary process for completing transactions using host card emulation (HCE) with authentication metadata integrated into the protocol, in accordance with various embodiments.

With reference to FIG. 3, an exemplary system 300 for authorizing transactions made at merchant 302 via user device 308 is shown, in accordance with various embodiments. User device 308 is similar to user device 108 of FIG. 1. User device 108 may be used to complete digital transactions using, for example, a digital wallet or other application using a transaction authorization protocol such as HCE. User device 308 may interface with merchant 302 over connection 305. Connection 305 may be an NFC connection, a Bluetooth connection, or any suitable connection between a point of sale of merchant 302 and user device 308. Merchant 302 and/or user device 308 may also be in electronic communication with network 304. Network 304 may enable communication between merchant 302, user device 308, and/or authenticator 306.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

System 300 may use a transaction authorization protocol to partially or fully complete a transaction. Issuer 307 may also communicate with merchant 302, authenticator 306, and/or user device 308 via network 304. Issuer 307 may determine whether to approve a transaction based in part on authorization metadata provided by authenticator 306. Authenticator 306 may also be operated by issuer 307 in various embodiments. Merchant 302 may also be a relying party on authentication conducted by authenticator 306. In that regard, merchant 302 may determine whether to proceed with a transaction based on the outcome of authentication provided by authenticator 306 in the form of authentication metadata.

In various embodiments, authenticator 306 may communicate using a transaction authorization protocol that includes one or more messages having authentication metadata. In that regard, authentication metadata may be integrated into messages between merchant 302, authenticator 306, issuer 307, and/or user device 308 to authenticate the identity of the user operating user device 308.

In various embodiments, authenticator 306 may maintain a database containing identify information for various users. The identity information maintained by authenticator 306 may include biometric templates such as, for example, fingerprint templates, facial recognition templates, vocal templates, handwriting templates, or other data suitable for authenticating a user. Authenticator 306 may also maintain a database of device identifiers such as device fingerprints, device IDs, MAC addresses, IP addresses, and/or other suitable device identifiers. The database may include data collected directly during user registration with authenticator 306 and/or partners of authenticator 306. The database may also include identity data augmented and/or federated between other entities using transaction authorization protocol.

In various embodiments, users may submit their biometric data and/or templates via user device 308 to authenticator 306 for identity verification based on comparison to the user biometric data maintained by authenticator 306 in a database. Authenticator 306 may also conduct authentication using a signature, PIN, passcode, pattern, biometrics, one-time passwords, knowledge based answers, device ID, device fingerprints, and other suitable authentication techniques.

Figure 4:
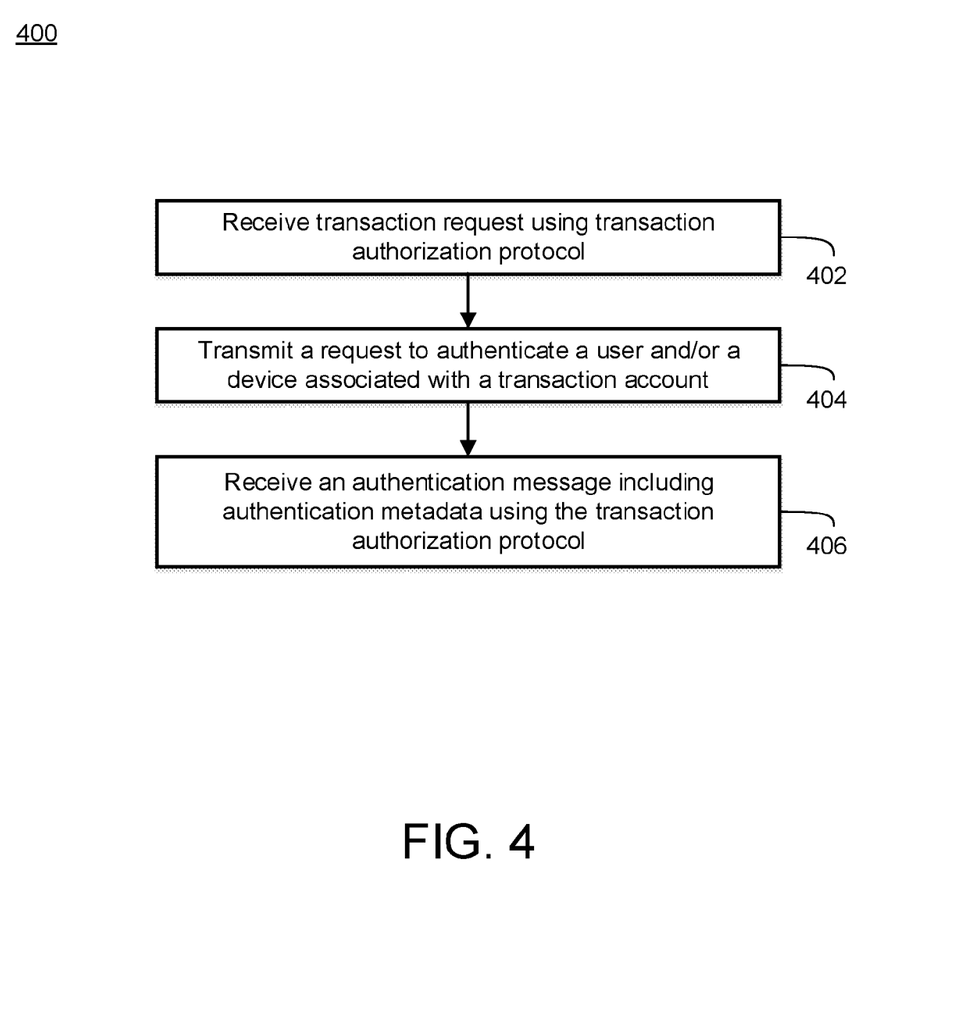
FIG. 4 illustrates an exemplary process for authenticating user identity for transactions using authentication metadata integrated into a transaction authorization protocol, in accordance with various embodiments.

In various embodiments, authenticator 306 may communicate the authentication results to relying parties such as, for example, merchant 302 and/or issuer 307 in the form of metadata using the transaction authorization protocol. Referring now to FIG. 4, an exemplary process 400 for a relying party (e.g., merchant 302 and/or issuer 307 of FIG. 3) to integrate identification-centric metadata into a transaction authorization protocol is shown, in accordance with various embodiments. For example, merchant 302 may run process 400 using merchant systems to authorize a transaction based on the results of user authentication. Similarly, issuer 307 may run process 400 using issuer systems to authorize a transaction based on the results of user authentication.

In various embodiments, the relying party may receive a transaction request using a transaction authorization protocol (Step 402). The transaction request may include transaction details such as date, time, merchant identifier, merchant location, transaction amount, and/or other suitable transaction details. The transaction request may also be associated with a transaction account. The transaction request may be, for example, user device 308 attempting a transaction with merchant 302 using an HCE protocol at a point of sale.

In response to receiving the transaction request, the relying party may transmit a request to authenticate a user and/or a user device associated with the transaction account (Step 404). The authentication request may use the transaction authorization protocol to request authentication using various techniques including biometric techniques. An authenticator (e.g., authenticator 306 and/or issuer 307 of FIG. 3 or card issuer ACS 106 of FIG. 1) may receive the authentication request. The authenticator may communicate directly with user device 308 to conduct authentication in response to the authentication request. For example, authenticator 306 may query user device 308 for a facial image in response to the authentication request identifying facial authentication as a desired authentication technique.

In various embodiments, the authenticator may construct a message using the transaction authorization protocol to summarize and describe the conducted and/or omitted authentication techniques as well as the outcome. The message may include authentication metadata such as statistics for the authentication techniques as a false match rate, false acceptance rate, false non-match rate, false artifact acceptance rate, false rejection rate, detection error tradeoff, equal error rate, failure to enrollee rate, or failure to capture rate. The message may include authentication metadata such describing biometric authentication results such as success, failure, blocked, not performed, inconclusive, timeout, or other suitable messages. The message may also include authentication metadata that describes the authentication processes and data used.

In various embodiments, the authenticator may construct the message using authentication metadata. The available authentication metadata may include metadata fields described in the standard outlined in "FIDO UAF Authenticator Metadata Statements v1.0" (referred to hereafter as "FIDO UAF") as made available by the FIDO Alliance at https://fidoalliance.org/specs/fido-uaf-v1.0-ps-20141208/fido-uaf-authnr-metadata-v1.0-ps-20141208.html and incorporated by reference herein in its entirety for all purposes. For example, the authenticator may construct the message to include the following metadata statements described in FIDO UAF in whole or in part: Metadata Keys, CodeAccuracyDescriptor, BiometricAccuracyDescriptor, VerificationMethodDescriptor, and/or Metadata Statement Format. Although the foregoing metadata formats and statements are listed as exemplary metadata for use by the authenticator in constructing an authentication message, other metadata descriptive of identification and authorization techniques may also be included.

The authentication metadata may provide for CDCVM authentication of user devices. The authentication metadata may provide CDCVM results including whether CDCVM was successful, failed, blocked, not performed, timed out, etc. The authentication metadata may also provide device form factors of the device that captured the authentication data used by the authenticator. The metadata may also provide the environment with which the device and/or user was verified including, for example, a trusted execution environment (TEE), rich execution environment (REE), or other environment. The metadata may also provide CDCVM context such as instant (i.e., just for the present authentication), prolonged (i.e., re-used a previous result), persistent (i.e., for a wearable), undefined, etc. The metadata may further provide access control if desired (i.e., which entity is authorized to access the CDCVM services). The metadata may also provide the ability to reset (e.g., from successful to not performed) the CDCVM.

In various embodiments, the authenticator may send the authentication message to the relying party. The relying party may receive the authentication message including authentication metadata using the transaction authorization protocol (Step 406). The authentication message may include the authentication metadata indicating a type of authentication conducted and/or an authentication outcome. For example, the authentication message may indicate that biometric authentication was conducted using facial, fingerprint, vocal, or other biometric authentication techniques. The relying party may determine whether to proceed in response to the authentication details described by the authentication metadata. The relying party may also integrate the authentication metadata received using the transaction authorization protocol into a risk analysis engine to determine the risk of fraud associated with a transaction. For example, a failed biometric authentication for a $1.00 transaction amount may not result in the relying party declining the transaction because the $1.00 risk is low. However, the failed biometric authentication in conjunction with a $1,000.00 transaction amount may result in the relying party declining the transaction because the $1,000.00 transaction amount is above a tolerable risk threshold for failed authentication. Other factors may be used in the risk assessment such as geographic location, past transaction history with the merchant, past transaction history with issuer, transaction time, CDCVM authentication results, other authentication results, other transaction details, or other suitable risk assessment information.

The foregoing systems enable transaction decisioning based at least in part on biometric authentication and/or CDCVM authentication using authentication metadata integrated directly into a transaction authorization protocol. Enhanced authentication functionality that includes biometric user authentication and/or CDCVM authentication in addition to the traditional CVM capabilities tends to improve the security of transactions by enabling the relying party to authorize or decline based on stronger and/or varied authentication techniques. By integrating the authentication metadata directly into transaction authorization protocols, merchants and issuers may use biometric and/or CDCVM identity verification by implementing the transaction authorization protocol while avoiding increased development to support biometrics and CDCVM in secondary communication channels.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. For example, the systems contemplated herein may be embodied as a customization of the EMV protocol and/or SafeKey protocol for web and/or device based transactions.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like. Consumer identification may be conducted by an authenticator as described above with reference to FIGS. 1-4.

Phrases and terms similar to "transaction account" may include any account that may be used to facilitate a financial transaction.

Phrases and terms similar to "financial institution," "issuer," or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to "buyer" or "user" may include any entity that receives goods or services in exchange for consideration (e.g. financial payment). For example, a buyer may purchase, lease, rent, barter or otherwise obtain goods from a supplier and pay the supplier using a transaction account.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computer system and from a client device of a user, an authorization request for a financial transaction using a financial transaction authorization protocol,
   wherein the authorization request includes a financial transaction amount, and
   wherein the authorization request is associated with a financial transaction account;
   transmitting, by the computer system and using the financial transaction authorization protocol, an authentication request to authenticate the user associated with the financial transaction account;
   receiving, by the computer system using the financial transaction authorization protocol and from an authenticator server, an authentication message lacking biometric data that is retained at the authenticator server,
   wherein the authentication message comprises authentication metadata that indicates an authentication type, statistics with rates about an authentication technique and an authentication outcome conducted by the authenticator server, and
   wherein the authentication type includes a biometric authentication of biometric data; and
   determining, by the computer system and based on the authentication message, a result of the authorization request for the financial transaction.

2. The method of claim 1, wherein the authentication type comprises a cardholder verification method (CVM).

3. The method of claim 1, wherein the authentication type comprises a consumer device cardholder verification method (CDCVM).

4. The method of claim 1, wherein the statistics with rates comprise at least one of a false match rate, a false acceptance rate, a false non-match rate, a false artifact acceptance rate, a false rejection rate, a detection error tradeoff, an equal error rate, a failure to enrollee rate, or a failure to capture rate.

5. The method of claim 1, wherein the authentication metadata indicates a successful authentication of the user associated with the financial transaction account.

6. The method of claim 1, wherein the result includes authorizing the financial transaction in response to the authentication metadata indicating a successful authentication outcome.

7. The method of claim 1, wherein the biometric authentication comprises at least one of a fingerprint authentication, a facial authentication, or a vocal authentication.

8. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor and from a client device of a user, an authorization request for a financial transaction using a financial transaction authorization protocol,
wherein the authorization request includes a financial transaction amount, and
wherein the authorization request is associated with a financial transaction account;
transmitting, by the processor and using the financial transaction authorization protocol, an authentication request to authenticate the user associated with the financial transaction account;
receiving, by the processor using the financial transaction authorization protocol and from an authenticator server, an authentication message lacking biometric data that is retained at the authenticator server,
wherein the authentication message comprises authentication metadata that indicates an authentication type, statistics with rates about an authentication technique and an authentication outcome conducted by the authenticator server, and
wherein the authentication type includes a biometric authentication of biometric data; and
determining, by the processor and based on the authentication message, a result of the authorization request for the financial transaction.

9. The method of claim 1, wherein the financial transaction authorization protocol includes at least one of host-card emulation, or SafeKey® 3-D Secure®.

10. The computer-based system of claim 8, wherein the authentication type comprises a consumer device cardholder verification method (CDCVM).

11. The computer-based system of claim 8, wherein the statistics with rates comprise at least one of a false match rate, a false acceptance rate, a false non-match rate, a false artifact acceptance rate, a false rejection rate, a detection error tradeoff, an equal error rate, a failure to enrollee rate, or a failure to capture rate.

12. The computer-based system of claim 8, wherein the authentication metadata indicates an unsuccessful authentication outcome of the user associated with the financial transaction account.

13. The computer-based system of claim 12, wherein the result includes declining the financial transaction in response to the authentication metadata indicating the unsuccessful authentication outcome.

14. The computer-based system of claim 8, wherein the biometric authentication comprises at least one of a fingerprint authentication, a facial authentication, or a vocal authentication.

15. An article of manufacture including a non-transitory, tangible computer readable storage medium having instructions stored thereon that, in response to execution by a processor, cause the processor to perform operations comprising:
receiving, by the processor and from a client device of a user, an authorization request for a financial transaction using a financial transaction authorization protocol,
wherein the authorization request includes a financial transaction amount, and
wherein the authorization request is associated with a financial transaction account;
transmitting, by the processor and using the financial transaction authorization protocol, an authentication request to authenticate the user associated with the financial transaction account;
receiving, by the processor using the financial transaction authorization protocol and from an authenticator server, an authentication message lacking biometric data that is retained at the authenticator server,
wherein the authentication message comprises authentication metadata that indicates an authentication type, statistics with rates about an authentication technique and an authentication outcome conducted by the authenticator server, and
wherein the authentication type includes a biometric authentication of biometric data; and
determining, by the processor and based on the authentication message, a result of the authorization request for the financial transaction.

16. The article of claim 15, wherein the authentication type comprises a consumer device cardholder verification method (CDCVM).

17. The article of claim 15, wherein the statistics with rates comprise at least one of a false match rate, a false acceptance rate, a false non-match rate, a false artifact acceptance rate, a false rejection rate, a detection error tradeoff, an equal error rate, a failure to enrollee rate, or a failure to capture rate.

18. The article of claim 15, wherein the authentication metadata indicates a successful authentication of the user associated with the financial transaction account.

19. The article of claim 15, wherein the result includes authorizing the financial transaction in response to the authentication metadata indicating a successful authentication outcome.

20. The article of claim 15, wherein the biometric authentication comprises at least one of a fingerprint authentication, a facial authentication, or a vocal authentication.

* * * * *